(12) United States Patent
Ito

(10) Patent No.: US 6,954,233 B1
(45) Date of Patent: Oct. 11, 2005

(54) ELECTRONIC IMAGE PICK-UP APPARATUS AND METHOD OF ADJUSTING THE FOCAL POSITION THEREOF

(75) Inventor: Junichi Ito, Hachioji (JP)

(73) Assignee: Olympus Optical, Tokyo (JP)

( * ) Notice: Subject to any disclaimer, the term of this patent is extended or adjusted under 35 U.S.C. 154(b) by 0 days.

(21) Appl. No.: 09/547,810

(22) Filed: Apr. 11, 2000

(30) Foreign Application Priority Data

Apr. 12, 1999 (JP) .................................. 11-104486

(51) Int. Cl.$^7$ ............................................ H04N 5/232

(52) U.S. Cl. ...................................... 348/350; 348/353

(58) Field of Search ................................ 348/345, 349, 348/350, 353, 188, 211.4, 211.99, 187; 250/201.1, 250/201.4, 201.7; 356/125; 346/111, 119, 346/133

(56) References Cited

U.S. PATENT DOCUMENTS

| | | | |
|---|---|---|---|
| 4,696,558 A | * | 9/1987 | Karasaki et al. ............ 396/104 |
| 4,853,731 A | * | 8/1989 | Tsujimura et al. ............ 396/90 |
| 4,969,006 A | * | 11/1990 | Ishibashi et al. ............ 396/104 |
| 5,369,461 A | * | 11/1994 | Hirasawa et al. ............ 396/135 |
| 5,597,999 A | * | 1/1997 | Kinba et al. ............. 250/201.7 |
| 5,793,482 A | * | 8/1998 | Tseng et al. ................. 356/124 |
| 5,815,205 A | * | 9/1998 | Hashimoto et al. ......... 348/373 |
| 5,815,748 A | * | 9/1998 | Hamamura et al. ......... 396/104 |
| 6,111,604 A | * | 8/2000 | Hashimoto et al. ...... 348/220.1 |

* cited by examiner

*Primary Examiner*—Wendy R. Garber
*Assistant Examiner*—Timothy J. Henn
(74) *Attorney, Agent, or Firm*—Frishauf, Holtz, Goodman & Chick, P.C.

(57) ABSTRACT

An electronic image pick-up apparatus acquires auto-focus data from each of an AF sensor module and an image sensor disposed in conjugate positions in a test mode, stores data on any relative deviation between those items of auto-focus data and drives a photographic lens based on the data of relative deviation of auto-focus in a normal mode.

13 Claims, 14 Drawing Sheets

FIG.4
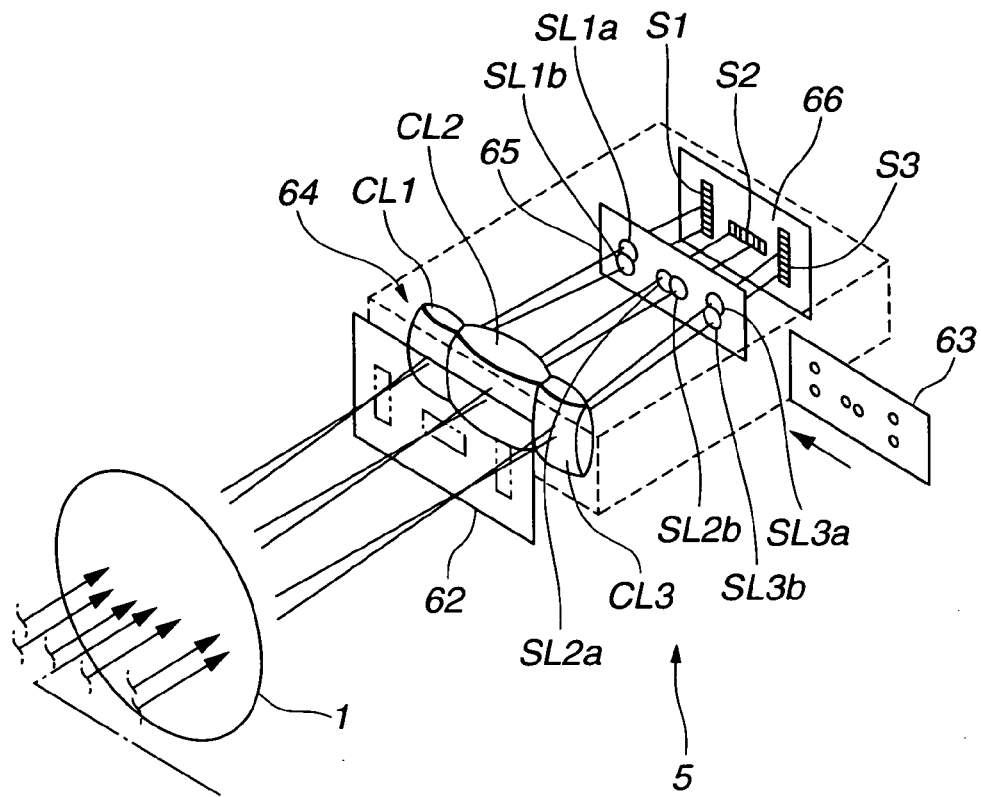
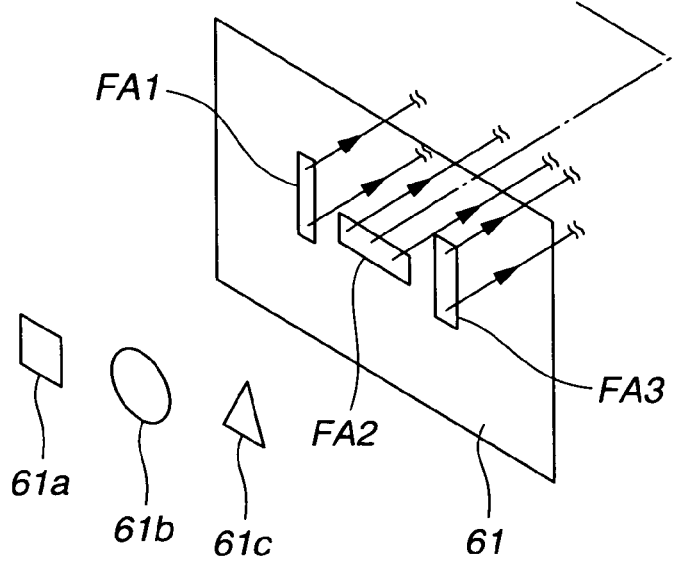

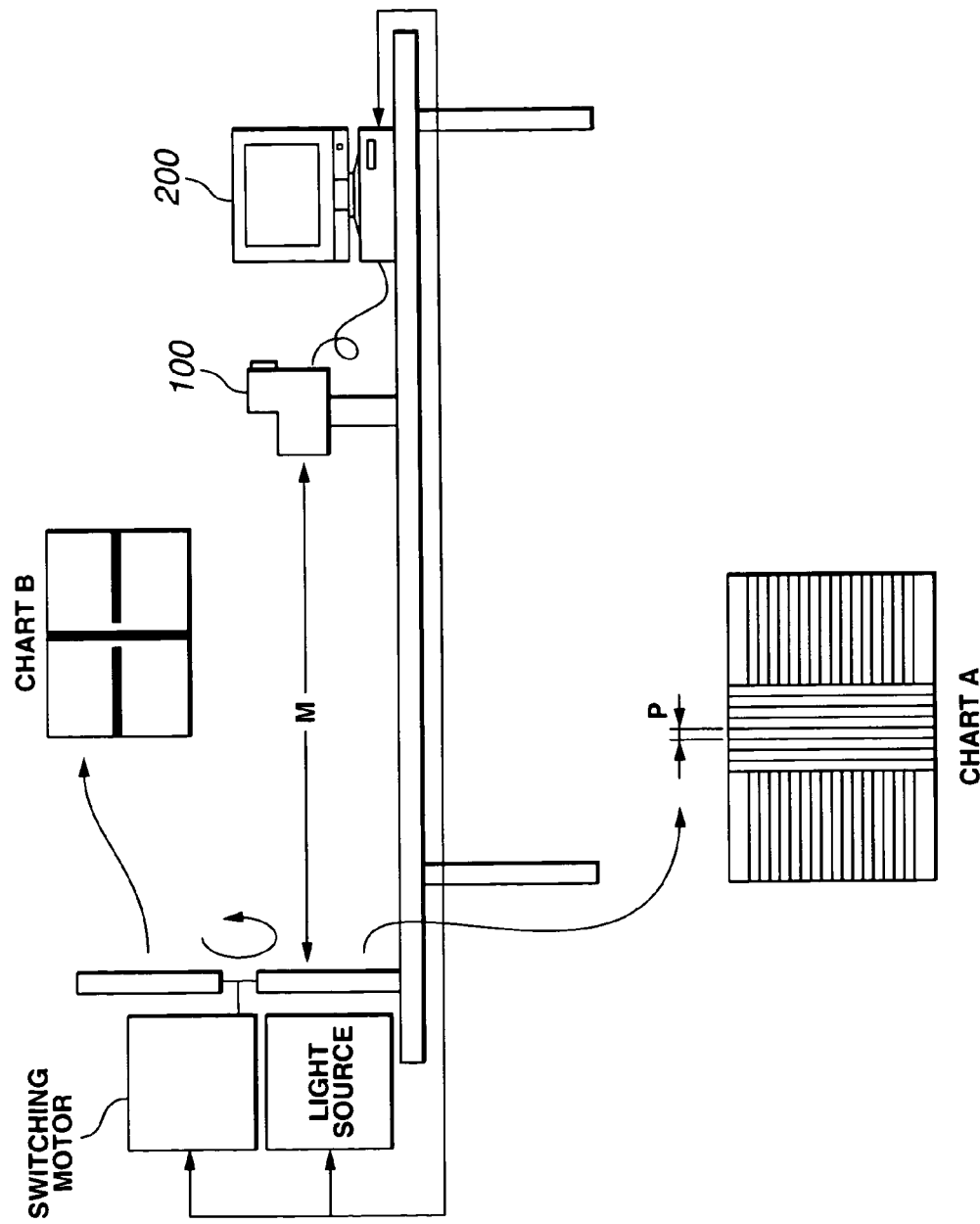

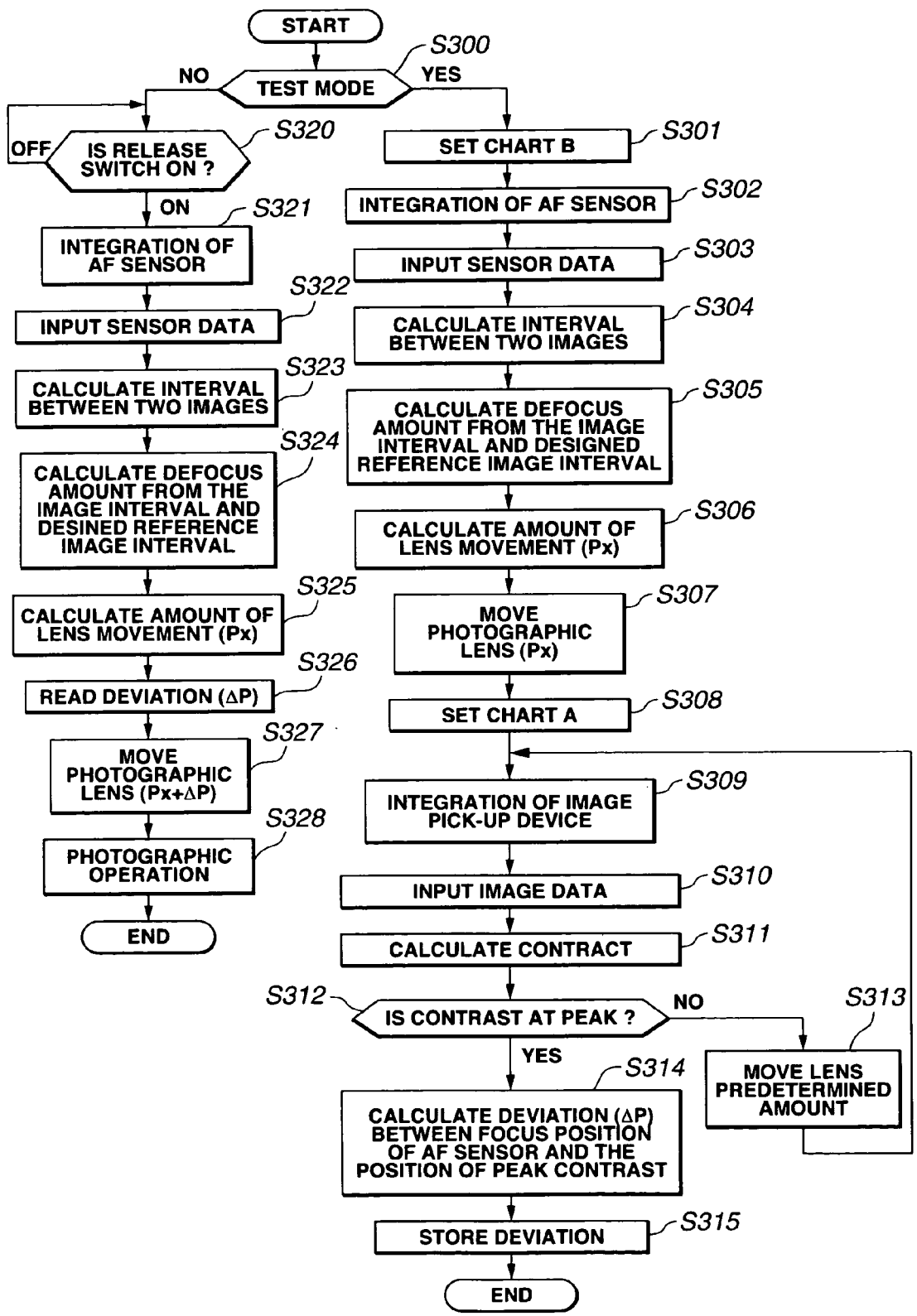

ELECTRONIC IMAGE PICK-UP APPARATUS AND METHOD OF ADJUSTING THE FOCAL POSITION THEREOF

BACKGROUND OF THE INVENTION

1. Field of the Invention

The present invention relates to an electronic image pick-up apparatus which performs photographic operations utilizing a solid-state image pick-up device.

2. Related Art Statement

In general, TTL phase difference type focus detection methods have been used for single-lens reflex cameras capable of photographing utilizing silver salt films. However, it is difficult to match a focal position detected by such a phase differential method with an actual film surface. This is attributable to various factors including errors that occur when a phase difference type sensor module is attached to a camera body and dimensional errors of an optical system that makes up the sensor module.

In general, steps for manufacturing a camera include an operation of adjusting any deviation between a focal position detected using a phase differential method and a film surface. Such an adjusting operation is carried out during a step provided near the final step for manufacturing a camera, and adjustment of the photographic lens is first carried out using an automatic collimator such that an image of an object at a predetermined distance is formed on a film surface. Next, a phase difference type focus detecting operation is performed in this state to determine parameters required for correcting the above-described deviation.

Specifically, rays from an object located equivalently at infinity are projected upon the photographic lens using the automatic collimator, and a sensor is temporarily provided to detect the contrast of an image formed by the photographic lens on the film surface of the camera. The photographic lens is then retracted to the extremity, and the position of the maximum contrast is thereafter detected from the sensor output while protruding the photographic lens to use the amount of protrusion at this time as infinity position information.

In a single-lens reflex camera utilizing a silver salt film, adjustment using an automatic collimator as described above can be easily carried out because the exposed surface of the film is exposed by opening the rear cover.

However, an electronic camera has no rear cover because it is loaded with no film. Therefore, the sensor for detecting contrast can not be temporarily attached.

Further, since an image pick-up device such as a CCD is provided in the position corresponding to the film surface, it is difficult to perform the adjusting operation using an automatic collimator.

It has been therefore necessary to perform an adjustment as described above using a different method in a camera system like an electronic camera in which a surface corresponding to a film surface is not exposed.

SUMMARY OF THE INVENTION

It is a first object of the invention to provide an electronic image pick-up apparatus in which the adjustment of the focal position of the image pick-up can be accurately and simply carried out.

It is a second object of the invention to provide an electronic image pick-up apparatus for which a step for adjusting the focal position of the image pick-up device can be simplified because the adjustment does not involve removal of the image pick-up device.

It is a third object of the invention to provide an electronic image pick-up apparatus in which the adjustment of the focal position can be carried out without any special device therefor.

It is a fourth object of the invention to provide an electronic image pick-up apparatus in which the focal position and a photographic surface can be matched more accurately.

Briefly, an electronic image pick-up apparatus according to the invention includes:

first focus detection means for photoelectrically converting a pair of images formed by a pair of respective rays which have passed through a photographic lens and for detecting an interval between the pair of images to output first auto-focus data associated with the focal condition of the photographic lens;

second focus detection means for outputting an image signal obtained by photoelectrically converting the images formed by rays which have passed through the photographic lens and for evaluating contrast of the image signal to output second auto-focus data associated with the focal condition of the photographic lens;

mode setting means for setting a normal mode and a test mode; and control means for controlling the first and second focus detection means to store data on relative deviation between the first and second auto-focus data in the test mode and for driving the photographic lens based on the first auto-focus data and the stored data on relative deviation.

The objects and advantages of the present invention will become further apparent from the following detailed explanation.

BRIEF DESCRIPTION OF THE DRAWINGS

FIG. 4 is an exploded perspective view of a major part of an AF sensor module of the electronic camera of the first embodiment of the invention showing a configuration of the same.

FIG. 13 is an illustration of an example of the execution of a reference image interval measuring mode in the electronic camera of the first embodiment of the invention.

FIG. 14 is a flow chart showing a method for matching a focal position and a photographic surface in an electronic camera according to a second embodiment of the invention.

DETAILED DESCRIPTION OF THE PREFERRED EMBODIMENTS

Preferred embodiments of the present invention will now be described with reference to the drawings.

Figure 1:
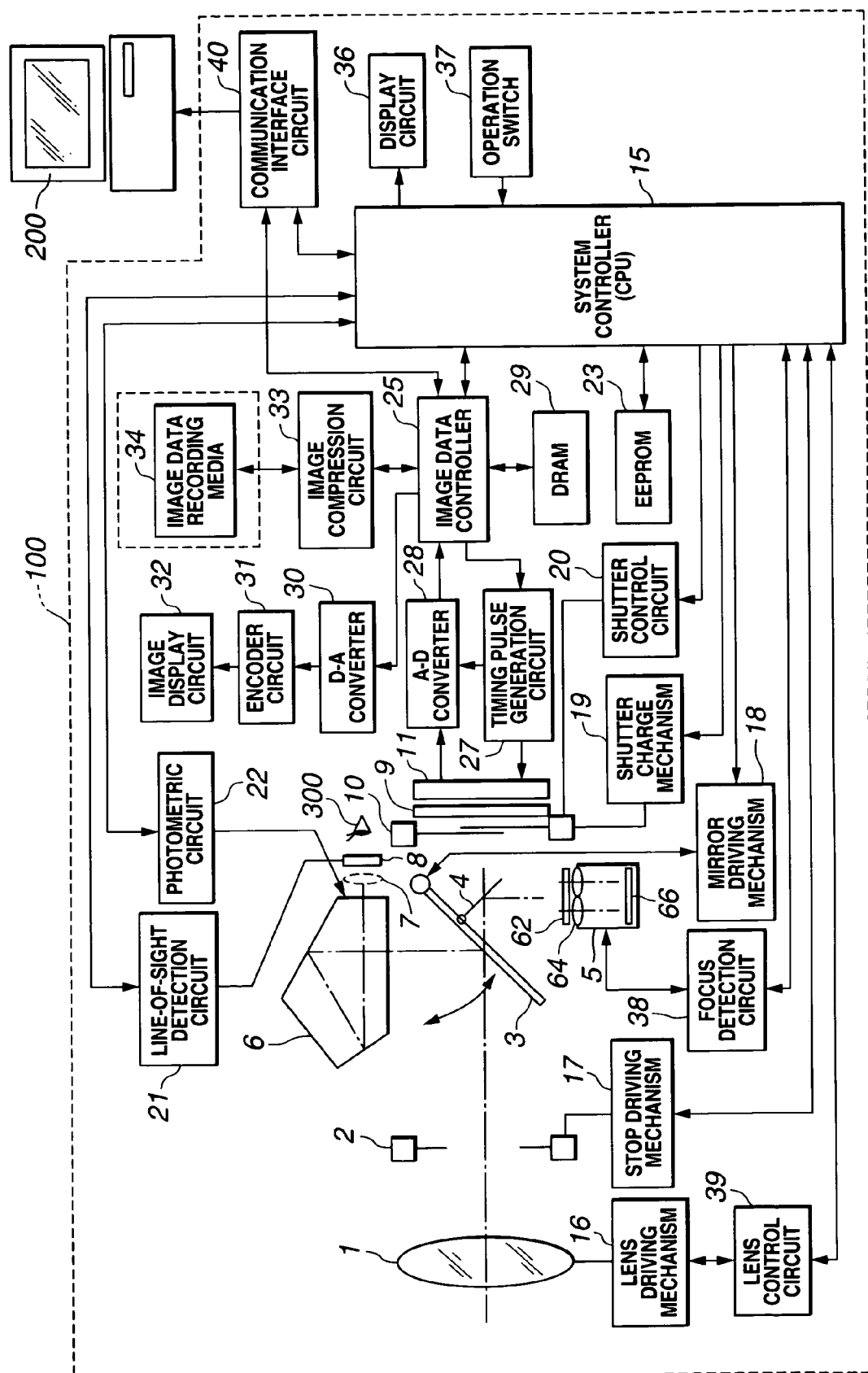
FIG. 1 is a block diagram showing a configuration of an electronic camera which is a first embodiment of the invention.

FIG. 1 is a block diagram showing a configuration of an electronic camera which is a first embodiment of the invention.

Referring to FIG. 1, in an electronic camera 100 of the present embodiment, rays of photographic light from an object image (not shown) are guided to a quick return mirror 3 rotatable in the direction of the arrow in the figure through a photographic lens 1 and a diaphragm 2 which is exposure means for adjusting the quantity of light. A half mirror is defined in a central region of the quick return mirror 3 to transmit a part of the rays when the quick return mirror 3 is directed downward. The transmitted rays are reflected by a secondary mirror 4 provided on the quick return mirror 3 to be guided to an AF sensor module 5.

Rays of photographic light reflected by the quick return mirror 3 travel to an eye of the photographer through a penta-prism 6 and an eyepiece 7.

When the quick return mirror 3 is directed upward, rays from the photographic lens 1 travel through a filter 9 and a focal plane shutter 10 which is a mechanical shutter to reach an image sensor 11 as an image pick-up device which is typically a CCD. The filter 9 has two functions, i.e., a function of guiding only visible rays of light to the image sensor 11 by cutting infrared and another function as an optical low-pass filter. The focal plane shutter 10 has front and rear screens and serves as shading means for controlling transmission and shading of rays from the photographic lens 1.

The secondary mirror 4 is folded when the quick return mirror 3 is directed upward.

The electronic camera 100 of the present embodiment has a system controller 15 constituted by a CPU for controlling the electronic camera as a whole and appropriately controls the operation of each part to be described later.

Connected to the system controller 15 are a lens control circuit 39 for controlling a lens driving mechanism 16 which moves the photographic lens 1 in the direction of the optical axis thereof for focusing, a stop driving mechanism 17 for driving the diaphragm 2, a mirror driving mechanism 18 for driving the quick return mirror 3 upward and downward, a shutter charge mechanism 19 for controlling a shutter charge of the focal plane shutter 10, a shutter control circuit 20 for controlling the travel of the front and rear screens of the focal plane shutter 10, a photometric circuit 22 connected to a photometric sensor disposed in the vicinity of the eyepiece 7, a line-of-sight detection circuit 21 connected to a line-of-sight detecting portion 8 provided in the vicinity of the eyepiece 7 for detecting the line of sight of a photographer 300, an EEPROM 23 for storing parameters which must be adjusted in order to control the electronic camera 100 and the like.

The electronic camera 100 can be connected to an external controller 200 which is typically a personal computer (PC), and the personal computer 200 and the system controller 15 can communicate with each other through a communication interface circuit 40.

The photometric sensor connected to the photometric circuit 22 is a sensor for measuring the luminance of an object which is not shown, and the output of the same is supplied to the system controller 15 through the photometric circuit 22.

The line-of-sight detection circuit 21 receives information from the line-of-sight detecting portion 8 for detecting the line-of-sight of the photographer 300 and transmits the result of detection to the system controller 15. The system controller 15 selects a particular area from among a plurality of focus areas based on the result of detection.

The system controller 15 controls the lens driving mechanism 16 to form an image of the object on the image sensor 11. The system controller 15 further controls the stop driving mechanism 17 for driving the diaphragm 2 based on a preset Av value and outputs a control signal to the shutter control circuit 20 based on a preset Tv value.

Driving sources for the front and rear screens of the focal plane shutter 10 are constituted by springs, and a spring charge is required for an operation following a shutter movement. The shutter charge mechanism 19 controls this spring charge.

An image data controller 25 is connected to the system controller 15. The image data controller 25 is correction data sampling means and correction means constituted by a DSP (digital signal processor) for controlling the image sensor 11 and correcting and processing image data input from the image sensor 11 based on instructions from the system controller 15.

Connected to the image data controller 25 are a timing pulse generation circuit 27 for outputting a pulse signal required for driving the image sensor 11, an A-D converter 28 for receiving a timing pulse generated by the timing pulse generation circuit 27 along with the output of the image sensor 11 and for converting an analog signal associated with an object image output by the image sensor 11 into a digital signal, a DRAM 29 for temporarily storing the resultant image data (digital data), a D-A converter 30 and an image compression circuit 31.

The DRAM 29 is used as storage means for temporarily storing image data before it is processed or subjected to data conversion into a predetermined format.

An image display circuit 32 is connected to the D-A converter 30 through an encoder circuit 31. Further, an image data recording medium 34 is connected to the image compression circuit 33.

The image display circuit 32 is a circuit for displaying image data obtained by the image sensor 11 and is generally constituted by a color liquid crystal display device.

The image data controller 25 causes the D-A converter 30 to convert the image data in the DRAM 29 into an analog signal which is in turn output to the encoder circuit 31. The encoder circuit 31 converts the output of the D-A converter 30 into a video signal (e.g., an NTSC signal) required for driving the image display circuit 32.

The image compression circuit 33 is a circuit for performing compression and conversion (e.g., JPEG) of the image data stored in the DRAM 29. The converted image data are stored in the image data recording medium 34. A hard disk, flash memory, floppy disk or the like is used as the recording medium.

Further, an operation display circuit 36 for displaying information of the operation mode of the electronic camera and exposure information (shutter time in seconds, stop value and the like) and a multiplicity of operation switches 37 operated by a user to cause the electronic camera to perform desired operations are connected to the system controller 15.

A detailed description will be made with reference to FIGS. 2 and 3 on the photographic lens 1 and lens driving mechanism 16.

Figure 2:
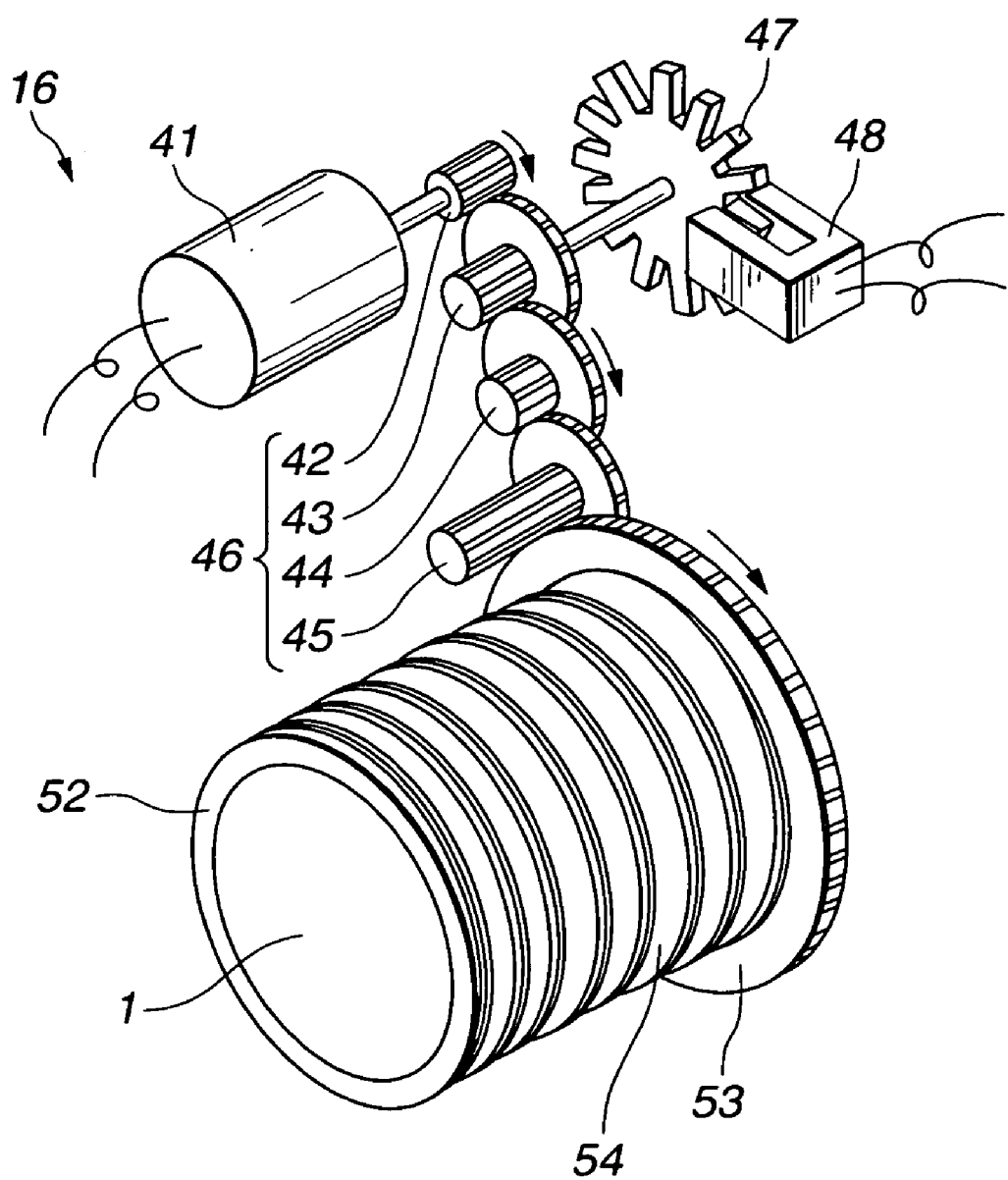
FIG. 2 is a perspective view of major parts of a photographic lens and a lens driving mechanism of the electronic camera of the first embodiment of the invention.

FIG. 2 is an external perspective view of major parts of the photographic lens and lens driving mechanism of the electronic camera of the first embodiment of the invention. FIG. 3 is a sectional view showing parts of the photographic lens, lens driving mechanism and camera body of the electronic camera.

As shown in FIG. 2, the photographic lens 1 is held in a focusing frame 52, and a focusing frame gear 53 is disposed integrally with one end of the focusing frame 52 and is engaged with a power transmission mechanism 46 to be described later. Further, a helicoid 54 is formed at the periphery of the focusing frame 52.

The lens driving mechanism 16 for driving the photographic lens 1 is formed by a motor 41 which is a driving source, a power transmission mechanism 46 constituted by a pinion gear 42 provided on an output shaft of the motor 41 and gears 43, 44 and 45 which are sequentially engaged with the same, a rotary slit 47 disposed coaxially with the gear 43 and rotated at the same speed and a photo-interrupter 48 for the rotary slit 47.

The final stage of the power transmission mechanism 46 is engaged with the focusing frame gear 53. Therefore, the rotary force of the motor 41 is transmitted to the focusing frame gear 53 through the power transmission mechanism 46 to rotate the focusing frame 52.

Pulse signals output by the photo-interrupter 48 are input to the system controller 15 through the lens control circuit 39, and the system controller 15 counts the pulse signals to detect the amount of protrusion of the photographic lens 1.

Figure 3:
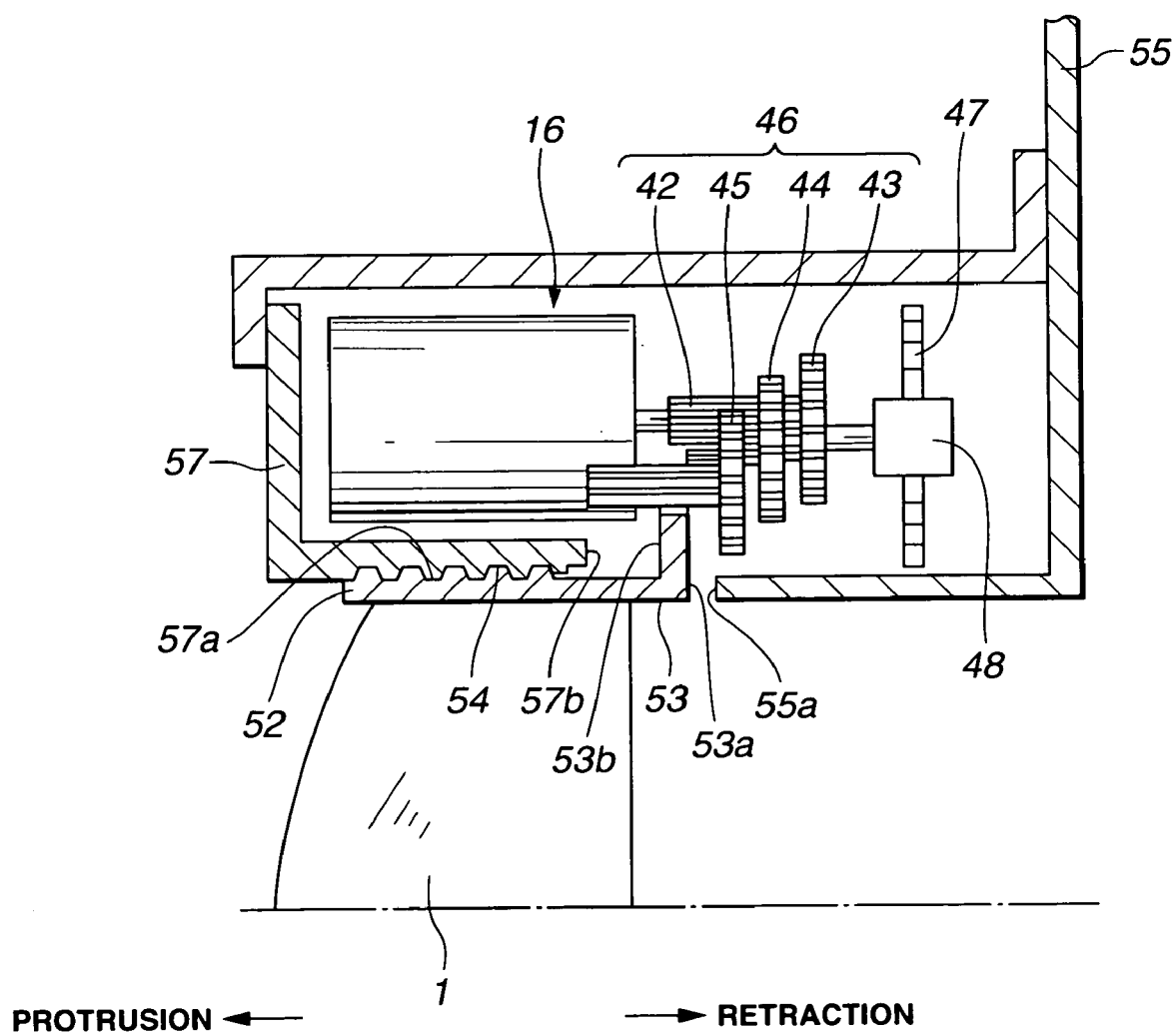
FIG. 3 is a sectional view of major parts of the photographic lens, the lens driving mechanism and a camera body of the electronic camera of the first embodiment of the invention.

As shown in FIG. 3, the photographic lens 1 (focusing frame 52) and lens driving mechanism 16 are disposed in a mirror frame 56 which is integrally secured to a part 55 of the camera body. A fixed frame 57 is secured to the forward end of the mirror frame 56 at a flange portion thereof. A helicoid 57a is formed on an inner circumferential surface of a frame portion of the fixed frame 57 to be engaged with the helicoid 54 provided on the focusing frame 52.

While the focusing frame 52 is thus engaged with the fixed frame 57 and is included in the mirror frame 56, the lens driving mechanism 16, i.e., the motor 41, power transmission mechanism 46 and the like are disposed in a space defined between the focusing frame 52 and mirror frame 56.

With such configurations of the focusing frame 52 and lens driving mechanism 16, when the motor 41 rotates CCW in response to a CCW direction signal (originating from an instruction of the system controller 1), the focusing frame 52 moves such that it protrudes from the fixed frame 57. The protruding movement can continue until a rear end 53b of the focusing frame gear 53 abuts a rear end face 57b of the fixed frame 57.

When the motor rotates CW in response to a CW direction signal, the focusing frame 52 moves such that it is retracted into the fixed frame 57. The retracting movement can continue until a rear end face 53a of the focusing gear frame 53 abuts a part 55a of the camera body.

A detailed description will now be made on the AF sensor module 5 with reference to FIG. 4.

As shown in FIG. 4, a major part of the AF sensor module 5 is formed by a field mask 62, a group of condenser lenses 64, a group of separator lenses 65, a stop mask 63, a group of line sensors 66 and the like. It is a sensor for dividing rays from objects 61a through 61c with eye-division optical systems associated with focus areas FA1, FA2 and FA3 and for forming images of the same on the group of line sensors 66 which are one-dimensional CCDs to perform focus detection according to the phase differential method.

Specifically, object rays in the focus areas FA1, FA2 and FA3 in a photographed area 61 associated with objects 61a, 61b and 61c are transmitted by the photographic lens 1, passed through the field mask 62 which eliminates stray rays, and incident upon respective ones of the group of condenser lenses 64 (condenser lenses CL1, CL2 and CL3).

The object rays are projected by the group of condenser lenses 64 upon respective open eye positions of the stop mask 63. The group of paired separator lenses 65 (separator lenses SL1a/SL1b, SL2a/SL2b and SL3a/SL3b) are disposed at the openings of the stop mask 63. Rays from exit eyes of the photographic lens 1 defined by the condenser lenses CL1 through CL3 and the openings of the stop mask 63 are projected by the respective separator lenses SL1a/SL1b, SL2a/SL2b and SL3a/SL3b upon respective line sensors S1, S2 and S3 of the group of line sensors 66 to form images thereon.

Each of the line sensors S1 through S3 is constituted by a pair of groups, i.e., groups a and b, and two images formed by a pair of separator lenses are projected upon sensors for respective images. By detecting an interval between the pair of images on each of the line sensors S1 through S3, the amounts of defocus (i.e., deviations from the focal position of the photographic lens) of the objects 61a through 61c in the focus areas FA1 through FA3 associated with the sensors relative to the film surface can be found. The amounts of defocus can be obtained according to a publicly known phase differential calculation.

The output ends of the line sensors S1 through S3 are connected to the system controller 15. Referring to the supply of the output of the line sensors S1 through S3, the output is first input to an interface circuit in the focus detection circuit 38. The output is then integrated by a line sensor control circuit provided in the interface circuit. When the output of integration reaches an adequate level, it is converted by an A-D converter into a digital value which is in turn transferred to the system controller 15.

Figure 5:
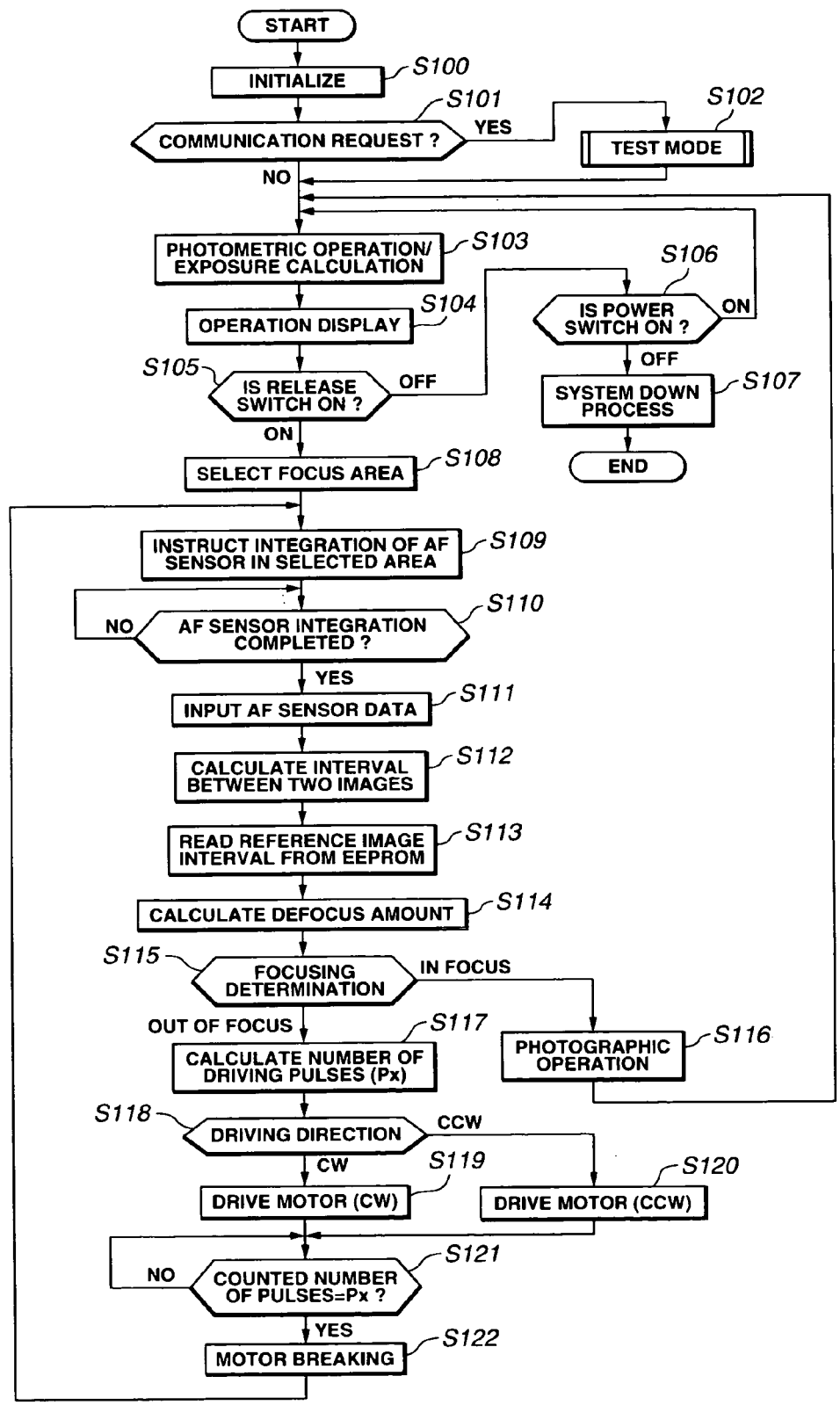
FIG. 5 is a flow chart showing a main routine executed by a system controller of the electronic camera of the first embodiment of the invention.

A main routine executed by the system controller 15 will now be described with reference to FIG. 5.

When a power switch which is one of the operation switches 37 is turned on, power is supplied to the system to cause the system controller 15 to start operating. The system controller 15 first performs initialization (step S100). Specifically, operations are performed including initialization of memories, I/O ports and each circuit connected to the system controller 1 (CPU) and activation of the image data controller 25 (DSP).

Next, at step S101, the system controller 15 determines whether there is any communication request from the external controller (personal computer) 200 through the communication interface circuit 40. If there is a communication request, the process proceeds to step S102 at which a subroutine "test mode" is executed. If there is no communication request, the process proceeds to step S103.

The test mode includes an adjusting operation required for the steps for manufacturing the camera and an operation of reading image data stored by a user in the camera.

At step S103, information on the luminance of an object is input to the system controller 15 from the photometric circuit 22. Based on the luminance information, it determines the shutter time that represents the integration time of the image sensor 11 (CDC) and a preset stop value. At step S104, it outputs data indicating the operating condition of the camera, the shutter time and the preset stop value to the operation display circuit 36.

At step S105, the system controller 15 detects the state of a release switch which is one of the operation switches 37. The process proceeds to step S108 if the switch is on and proceeds to step S106 if it is off.

At step 106, the system controller 15 detects the state of the power switch. If the power switch is off, the system operation must be terminated. Therefore, the process proceeds from step S106 to step S107 where a process for system termination is carried out, and the system controller 15 thereafter stops operating. If the power switch is on, the process proceeds to step S103 from which the camera operation is continued.

When the process proceeds from step S105 to step S108, the system controller 15 selects one of the three focus areas (FA1, FA2 and FA3 in FIG. 4) based on the output of the line-of-sight detection circuit 21. At step S109, it instructs the focus detection circuit 38 to integrate the line sensors 66 associated with the selected area.

At step S110, the system controller 15 waits for the completion of the integration of the selected line sensors 66.

When the integration of the line sensors 66 is completed, the focus detection circuit 38 performs A-D conversion of the output of each of elements that make up the line sensors 66 and outputs the result to the system controller 15. The data obtained by the conversion are input to the system controller 15 at step S111.

At step S112, the system controller 15 calculates the distance between two images formed on the line sensors 66 by a pair of separator lenses 65 (image interval). The calculation is carried out using a known method which will not be described here.

At step S113, the system controller 15 reads a reference image interval from the EEPROM 23. The reference image interval is the distance between two images formed on the line sensors 66 when an image of an object is formed on the image pick-up device by the photographic lens 1. This image interval is measured in the subroutine "test mode".

Thereafter, at step S114, the system controller 15 calculates a defocus amount from the difference between the current image interval obtained at step S112 and the reference image interval.

Table 1 shows reference image intervals stored in the EEPROM 23.

TABLE 1

| Focus Area | Reference Image Interval |
| --- | --- |
| FA1 | 67.50 (elements) |
| FA2 | 70.20 |
| FA3 | 68.90 |

In the present embodiment, a reference image interval is stored for each of the three focus areas (FA1, FA2 and FA3) in particular addresses defined on the EEPROM 23. The best imaging point varies depending on the position of focus detection because of the astigmatism of the photographic lens 1. Therefore, a reference image interval must be stored for each of the three focus areas.

While the electronic camera of the present embodiment employs a single-focus lens, the astigmatism changes depending on the focal length when a zoom lens is used. In such a case, reference image intervals in accordance with focal lengths are stored.

Figure 11:
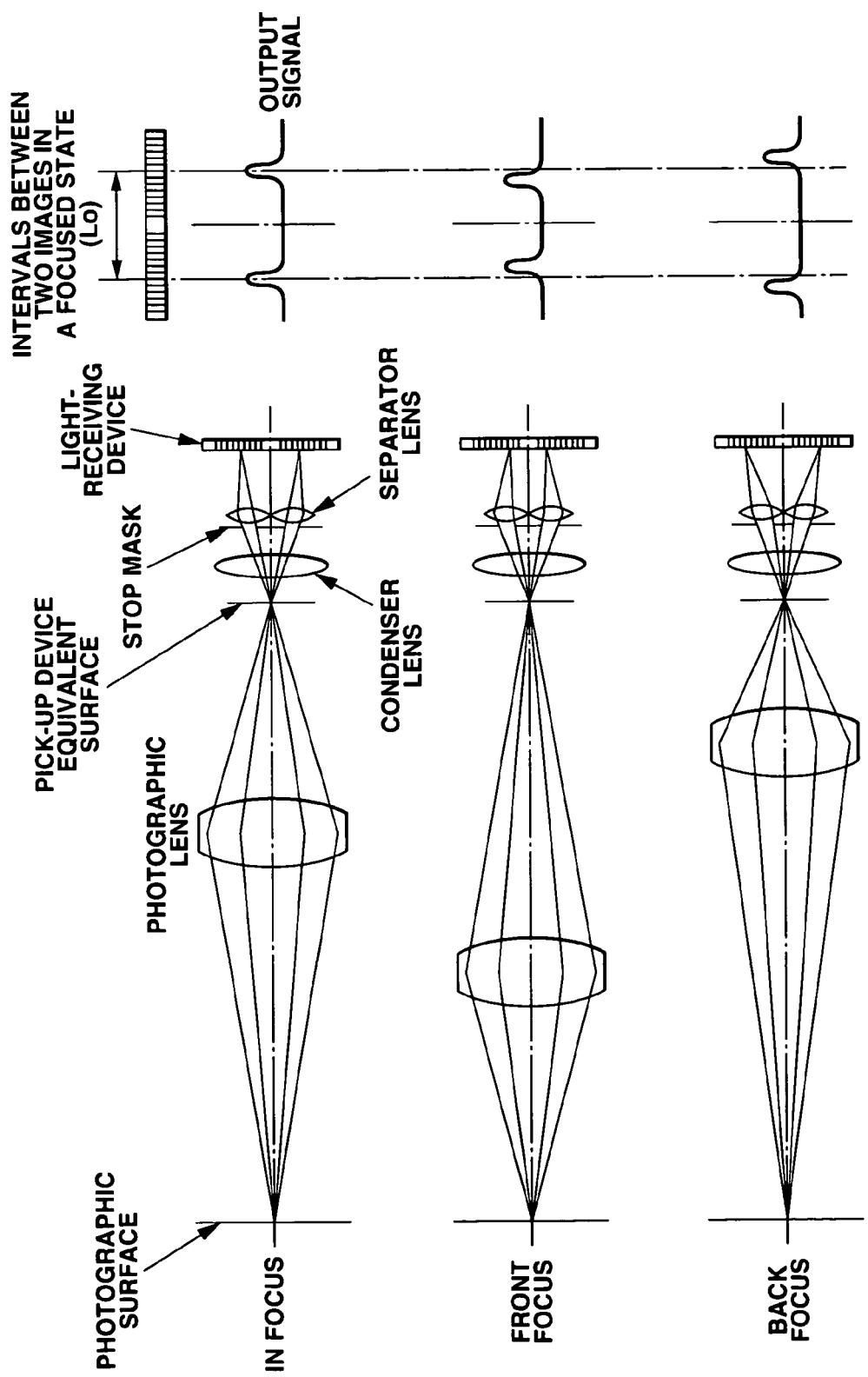
FIGS. 11A, 11B and 11C are of a principle behind the detection of a defocus amount.

A principle behind the detection of a defocus amount will now be described with reference to FIGS. 11 and 12.

As illustrated, the image interval on the line sensors have a certain value when the image pick-up device is in focus. Such a value can be determined during designing. In practice, the design value may not be achieved because of dimensional variation of parts and assembly-related errors. In practice, it is therefore difficult to identify the image interval (reference image interval Lo) without performing measurement. As apparent from FIG. 11, an image interval smaller than the reference image interval Lo indicates a front-focus, and an image interval greater than the reference image interval indicates a back-focus.

Figure 12:
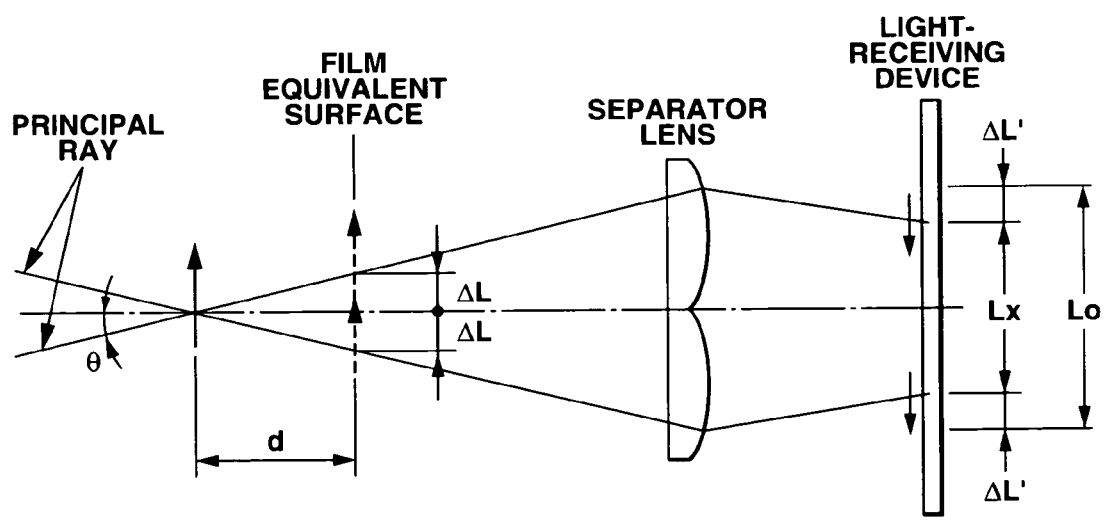
FIG. 12 is another illustration of a principle behind the detection of a defocus amount.

FIG. 12 illustrates a model in which the condenser lenses are deleted from the optical system of the AF sensor module 5.

As illustrated, a defocus amount L can be expressed by the following expression:

$$d = \Delta L / \tan \theta = \Delta L' / \beta \cdot \tan \theta \qquad \text{Expression 1}$$

where θ represents the angle of the principal ray; β represents the magnification of the separator lenses; ΔL and ΔL' represent amounts of movement of images; and β tan θ is a parameter which is determined when the AF sensor module 5 is designed.

ΔL' can be identified from the reference image interval Lo and the current image interval Lt.

Referring again to FIG. 5, at step S115, the system controller 15 determines whether focusing has been properly achieved or not from the defocus amount thus identified. If it determines that focusing has been achieved, the process proceeds to step S116.

At step S116, the image pick-up device is integrated according to conditions determined at step S103 to fetch the image data. The image data are converted into a predetermined format and are thereafter stored in the image data recording medium.

When it is determined at step S115 that focusing has not been achieved, the process proceeds to step S117. At step S117, the defocus amount is converted into a lens driving amount (Px: the number of pulses of the photo-interrupter). The process proceeds from step S118 to step S119 in the front-focus state to rotate the motor 41 CW. As a result, the photographic lens 1 is retracted. The driving of the photographic lens 1 is continued until the counted number of pulses generated by the photo-interrupter 48 reaches Px.

When the counted number reaches Px, the system controller 15 proceeds from step S121 to step S122 where it brakes the motor 41 to stop the movement of the photographic lens 1. It proceeds to step S109 to perform the focus detecting operation again.

When the defocusing direction represents a back-focus state, the system controller 15 proceeds from step S118 to step S120 to drive the photographic lens 1 in the protruding direction.

Figure 6:
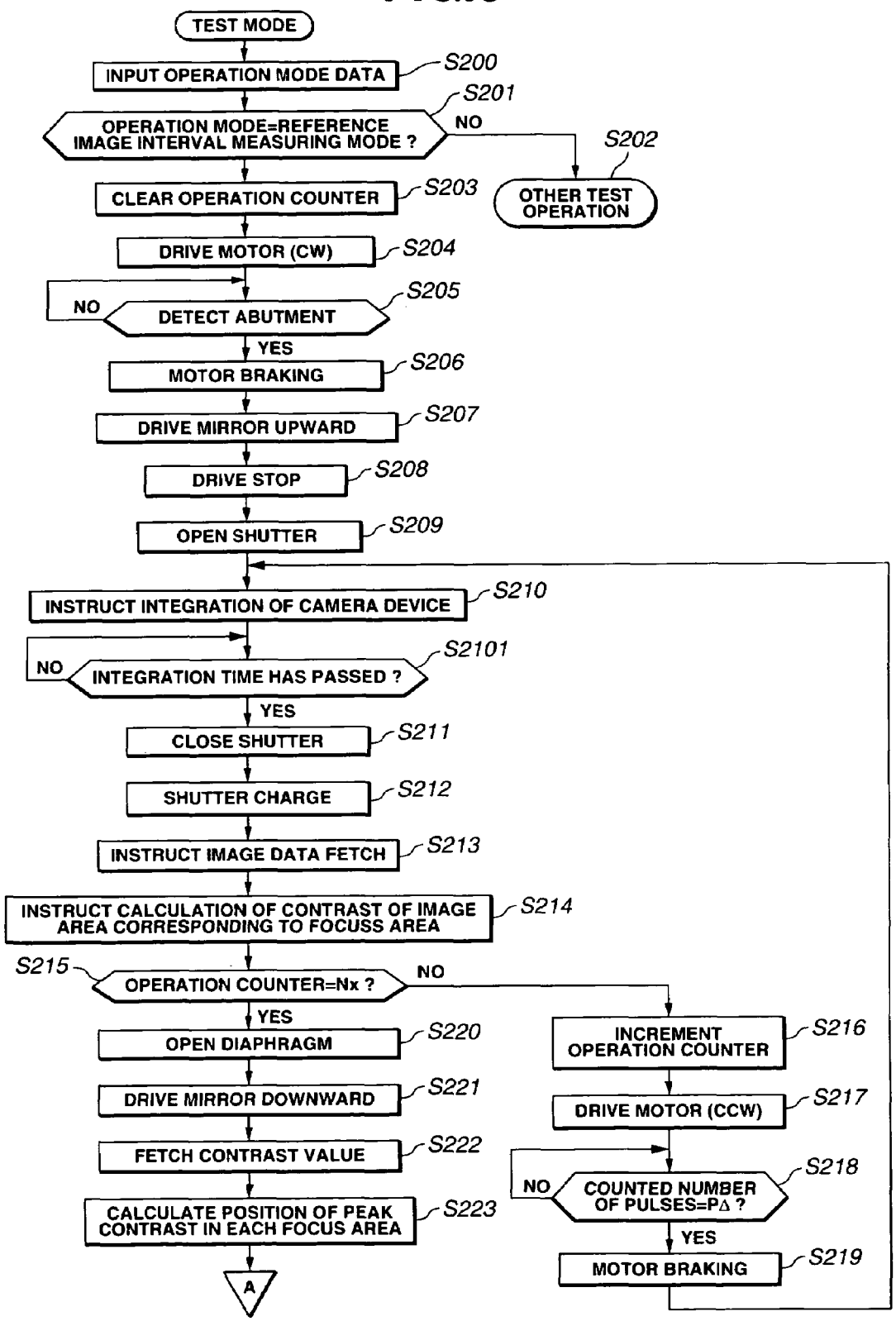
FIG. 6 is a flow chart showing a first portion of a subroutine "test mode" of the electronic camera of the first embodiment of the invention.
Figure 7:
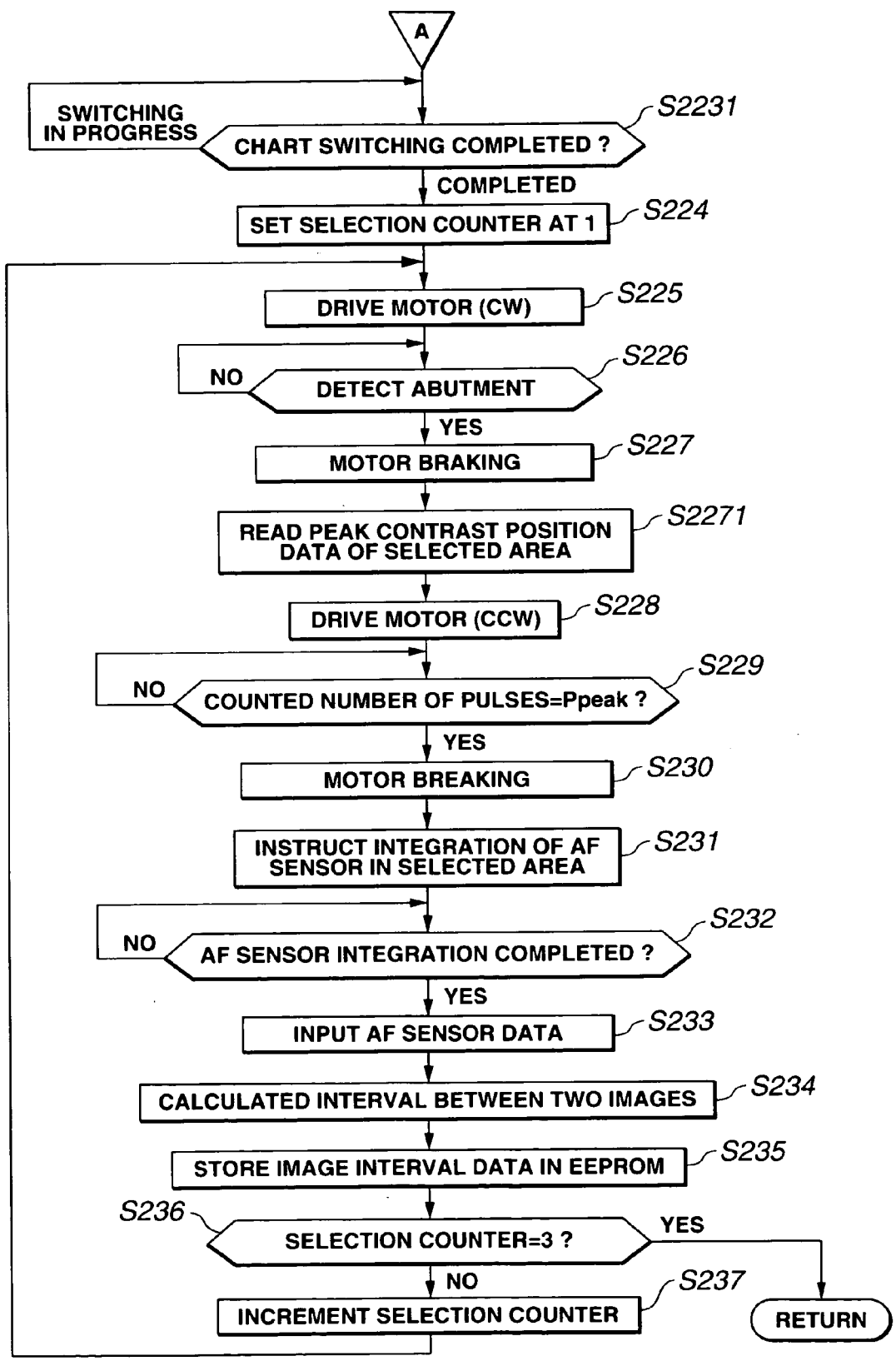
FIG. 7 is a flow chart showing the remaining portion of the remaining portion of the subroutine "test mode" of the electronic camera of the first embodiment of the invention.

The subroutine "test mode" will now be described with reference to FIGS. 6 and 7. The following description of an operation will be made basically on an assumption that the operation is performed by the system controller 15.

At step S200, data indicating an operation mode is input to the system controller 15 from the external controller 200. It is determined at step S201 whether the operation mode is a reference image interval measurement mode. If it is the reference image interval measurement mode, the process proceeds to step S203 and, if not, the process proceeds to step S202. When the reference image interval measurement mode is executed, the electronic camera 100 is secured in advance to a bench as shown in FIG. 13. Black and white stripes are used as the chart (A) in FIG. 13. The pitch P of the stripes and the distance M from the electronic camera 100 to the chart are set at appropriate values taking the resolution of the photographic lens 1 and the pitch of the pixels forming the image pick-up device into consideration.

At step S203, the system controller 15 clears an operation counter. At step S204, it outputs a driving signal to cause the motor 41 to rotate CW to the lens control circuit 39. As a result, the focusing frame 52 starts moving in the retracting direction.

The motor 41 continues rotating until a part 53a of the focusing frame gear 53 abuts the part 55a of the camera body, and the photo-interrupter 48 continues outputting the pulse signals as long as the motor 41 rotates. Thereafter, the pulse signals disappear when the part 53a of the focusing frame gear 53 abuts the part 55a of the camera body to stop the motor 41.

At step S205, the system controller 15 detects the pulse signals and stands by until the pulse signals disappear. When the pulse signals disappear, it proceeds from step S205 to step S206 to output a brake signal to the lens control circuit 39. This stops the motor 41. At this time, the focusing frame gear 52 is stopped in the position of maximum retraction.

Further, the system controller 15 drives the quick return mirror 3 upward at step S207 in order to guide rays from the photographic lens 1 to the image sensor 11.

At step S208, the system controller 15 drives the diaphragm 2 to a predetermined position. At this time, the diaphragm 2 is driven to a value at which the detection of maximum contrast is likely to occur at the image sensor 11. In general, a value that results in the maximum opening of the diaphragm 2 may be employed, although such a value of opening does not necessarily provide the best result.

At step S209, the system controller 15 controls each part such that the focal plane shutter 10 is opened. At step S210, it instructs the image data controller 25 (DSP) to perform an operation of integrating the line sensors 66. At step S2101, it stands by for a predetermined time. When the integration time passes, the process proceeds to step S211 where the focal plane shutter 10 is closed.

At step S212, the system controller 15 charges the focal plane shutter 10 in preparation for the next operation. At step S213, it instructs the image data controller 25 to fetch image data from the image sensor 11. At step S214, information on the positions of focus areas is output to the image data controller 25.

The image data controller 25 calculates contrast values from image data associated with the three focus areas and stores them in the DRAM 29 through the system controller 15.

Figure 8:
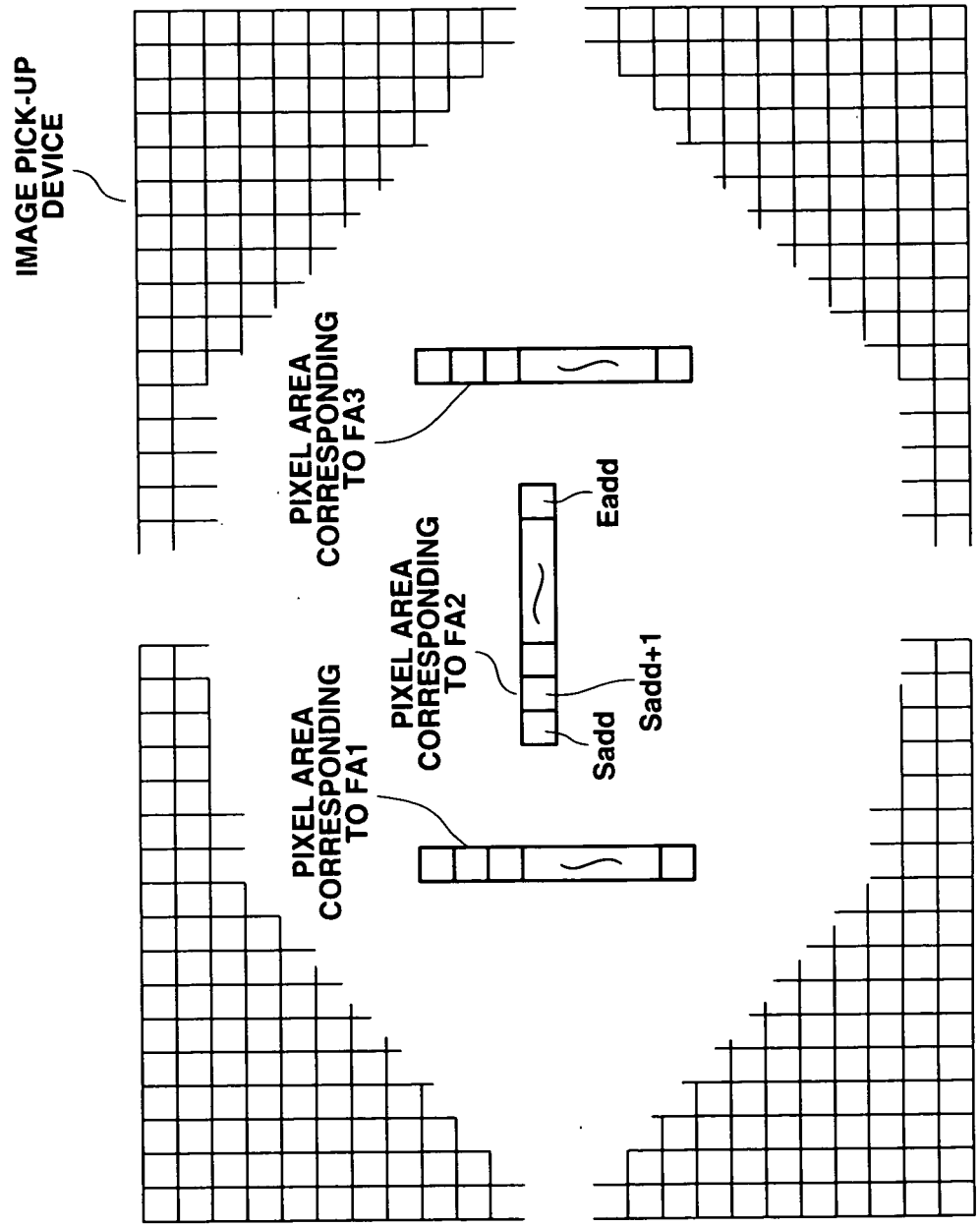
FIG. 8 is an illustration of an image pick-up device of the electronic camera of the first embodiment of the invention and pixel areas whose contrast is calculated.

FIG. 8 is an illustration showing the positional relationship between the image sensor 11 and pixel areas where contrast calculation is to be carried out.

For example, contrast calculation is carried out according to the following expression.

$$\text{Contrast} = \sum_{n=Sadd}^{Eadd} |X_{n+1} - X_n| \qquad \text{Expression 2}$$

where Sadd represents the address of the memory in which the starting pixel data of an area to be calculated is stored; Eadd represents the address of the memory in which the pixel data at the end of the area to be calculated is stored; and Xn represents the output value of each of the pixels that make up the image sensor 11.

When contrast calculation in the image data controller 25 is completed, the system controller 15 determines whether the count value in the operation counter has reached a predetermined number of times (Nx) at step S215. If the value in the operation counter is not Nx, the process proceeds from step S215 to step S216.

At step S216, the system controller 15 increments the operation counter. At step S217, it outputs a driving signal to the lens control circuit 39 to rotate the motor 41 CCW. This causes the focusing frame 52 to start moving in the protruding direction.

At step S218, the system controller 15 stands by until the number of the pulse signals generated by the photo-interrupter 48 equals a predetermined value PΔ. When the pulse count value reaches PΔ, the process proceeds from step S218 to step S219. At step S219, the motor 41 is braked to stop the movement of the photographic lens 1. The process then proceeds to step S209 to calculate contrast from the output value of the image sensor 11 again.

The operations of calculating contrast and protruding the photographic lens 1 by a predetermined amount are repeated until the number of operations reaches Nx. When the number of operations reaches Nx, the process proceeds from step S215 to step S220. At step S220, the system controller 15 returns the diaphragm 2 to the open position.

At step S221, the system controller 15 returns the quick return mirror 3 to the downward position. At step S222, contrast values calculated based on image data are input from the image data controller 25.

Figure 9:
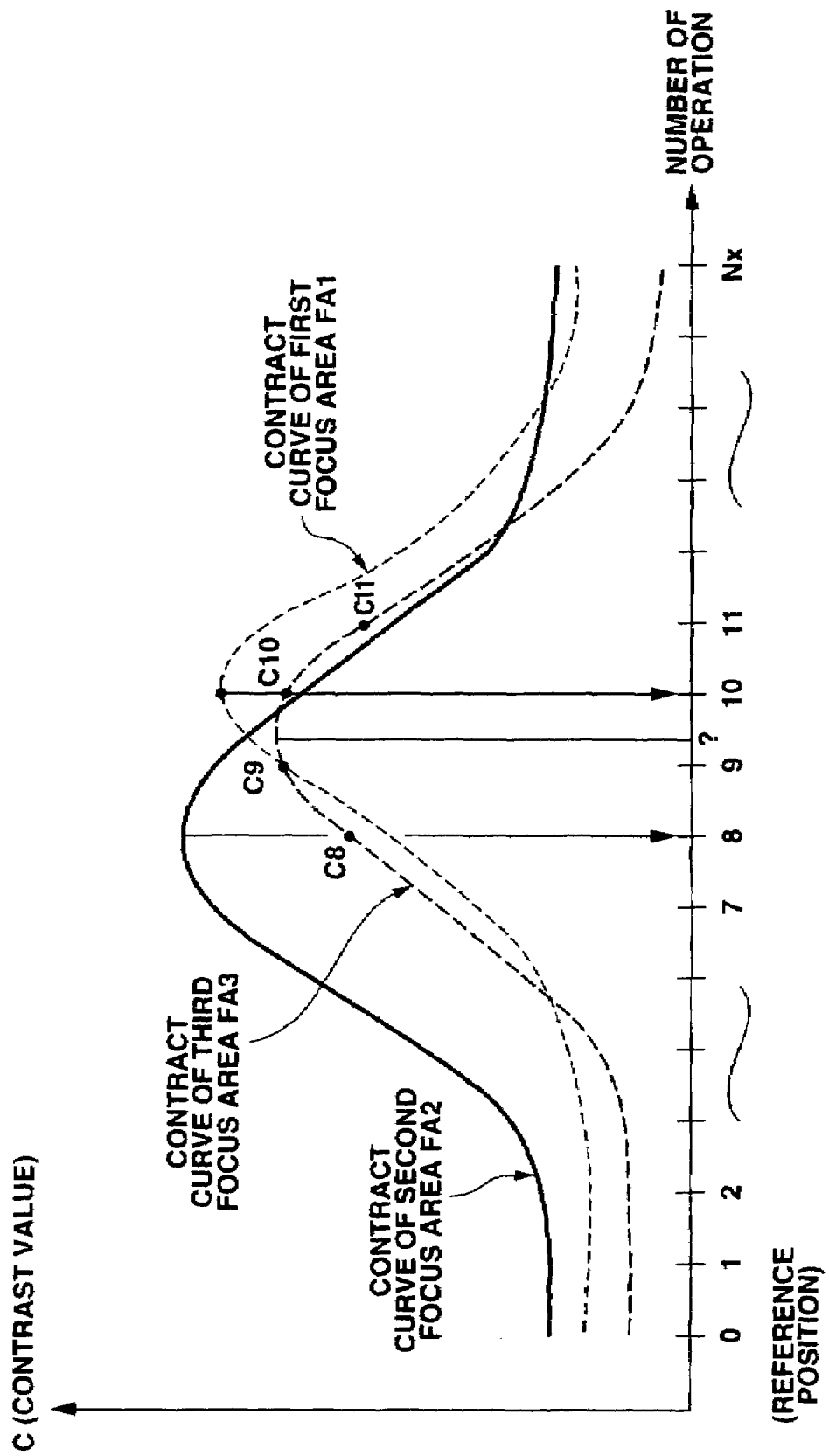
FIG. 9 is a graph showing an example of a plot of contrast values obtained from the output of the image pick-up device of the electronic camera of the first embodiment wherein the number of operations is plotted on the horizontal axis and the contrast values are plotted on the vertical axis.

FIG. 9 is a plot of contrast values obtained from the output of the image sensor 11 in which the horizontal axis represents the number of operations and the vertical axis represents the contrast values.

At step S223, the system controller 15 finds the operation which has resulted in the maximum contrast value. The number of operations which has resulted in the maximum contrast is then multiplied with PΔ. The result of this calculation is data of the position of peak contrast (Ppeak).

As apparent from FIG. 9, the first focus area FA1 has the maximum contrast value at the tenth operation. Let us assume that PΔ is 10 pulses. Then, the peak position data for the first focus area FA1 is 100 (tenth×10) pulses. That is, the contrast peaks when the photographic lens 1 is protruded in an amount corresponding to 100 pulses from the position of the maximum retraction, and an image of the chart is formed on the image pick-up device.

Peak position data for the second focus area FA2 can be similarly calculated at 80 pulses.

Figure 10:
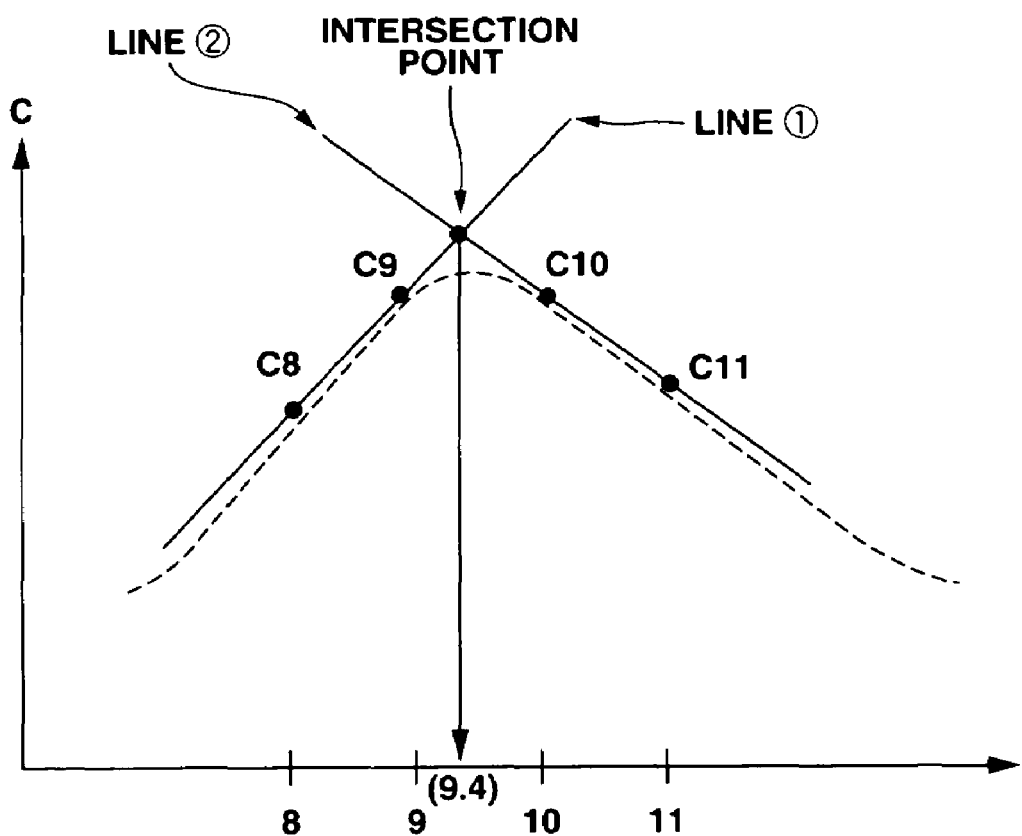
FIG. 10 is an illustration of a method for approximating a maximum contrast value in the third focus area shown in FIG. 10.

In the case of the third focus area FA3 in which the maximum contrast value appears between the ninth and tenth operations, the position of the maximum value between the ninth and tenth operations can be calculated using the method shown in FIG. 10. Specifically, the left side of the peak of the contrast curve is linearly approximated (line 1) using contrast values C8 and C9 at the eighth and ninth operations. Similarly, the right side of the peak of the contrast curve is linearly approximated (line 2) using C10 and C11. Then, the position of the maximum contrast value can be identified by finding the point of intersection between the two lines.

If the resultant value is 9.4-th operation, the peak position data for the third focus area FA3 is 94 pulses. Peak position data for the three focus areas can be summarized as shown in Table 2.

TABLE 2

| Focus Area | Peak Contrast Position |
|---|---|
| FA1 | 100 (pulses) |
| FA2 | 80 |
| FA3 | 94 |

The number (Nx) of contrast detecting operations and the amount (PΔ) of lens protrusion must be determined in consideration of parameters including the optical characteristics of the photographic lens 1, the conversion ratio for the conversion of the speed of the motor 41 into the movement of the lens 1 and dimensional variations of the frame that supports the photographic lens 1.

Those parameters can not be fixed uniformly, and unexpected changes may be required for such parameters. In the present embodiment, the quantities Nx and PΔ are stored in the EEPROM 23 taking such a situation into consideration. This makes it possible to set optimum values as required.

The system controller 15 then stands by at step S2231 until the personal computer 200 changes the chart. This is because the chart for detecting the positions of peak contrast is not suitable for focus detection with a phase difference type AF sensor.

At step S224, the system controller 15 sets "1" in the selection counter. The value of the selection counter indicates a focus area.

The operations at subsequent steps S225 through S227 are the same as the operations at steps S204 through S206. Specifically, the system controller 15 moves the photographic lens 1 to the position of maximum retraction. Peak contrast position data are data measured using the position of maximum retraction of the photographic lens 1 as a reference. Therefore, the processes at steps S225 through S227 are required to move the photographic lens 1 to a position of peak contrast (focus position).

At step S2271, the system controller 15 reads the peak position data for the focus area corresponding to the value in the selection counter from a memory in the system controller 15. For example, when the value in the selection counter is "1", the peak position data (Ppeak) for the first focus area is read. As shown in Table 2, the Ppeak is "100".

At steps S228 through S230, the system controller 15 protrudes the photographic lens 1 until the counted number of pulses from the photo-interrupter 48 reaches Ppeak. At this time, the object image formed on the region of the line sensor 66 corresponding to the focus area FA1 is in focus. An interval between two images formed on the line sensor 66 of the AF sensor module 5 at this time must be found.

At step S231, the system controller 15 instructs the focus detection circuit 38 to perform integration of the line sensor 66 associated with the focus area FA1. At step S232, it stands by until the integration of the line sensor 66 is completed. When the integration is completed, the output of the line sensor 66 is subjected to A-D conversion and then output to the system controller 15.

The data output by the line sensor 66 are read into the system controller 15 at step S233. At step S234, the system controller 15 calculates an image interval associated with the focus area FA1 from the data. The image interval data calculated here is reference image interval data for the focus area FA1. This data is stored in a predetermined address of the EEPROM 23 at step S235.

At step S236, the system controller 15 determines whether the value in the selection counter is "3". If it is not "3", the process proceeds to step S237 to increment the selection counter. The process then proceeds to step S225 to obtain reference image interval data for the next focus area.

When the calculation of reference image interval data for the three focus areas is completed, the value in the selection counter is "3", and the process returns from step S236 to the main routine.

As described above, adjusting steps can be simplified for the electronic camera according to the first embodiment of the invention because there is no need for removing the image pick-up device to adjust the focal position of the image pick-up device.

The adjustment is possible without any special device such as an automatic collimator. That is, accurate adjustment can be achieved even at service centers and the like having only simple equipment.

A second embodiment of the present invention will now be described.

In the first embodiment, a reference image interval is determined based on the position of the photographic lens at which images of an object are formed on the image pick-up device. A design reference image interval is determined when the AF sensor module 5 is designed. It is therefore possible to calculate an amount of defocus using the design reference image interval. An amount of lens movement (number of pulses) can be calculated from the defocus amount to form an image of the object in a design focal position by moving the lens by the amount.

However, when the image pick-up device is not mounted on the camera body in accordance with design values, the design focal position can deviate from the photographic surface of the image pick-up device. In consideration of variation of accuracy and the like that occur during the manufacture of the AF sensor module 5, measures must be taken further to match the design focal position and the photographic surface of the image pick-up device with higher accuracy.

An electronic camera according to the second embodiment of the invention has been conceived taking such a situation into consideration, and it is possible to match the design focal position and the photographic surface of the image pick-up device with higher accuracy.

Since the configuration of the electronic camera of the present embodiment as represented by the block diagram of FIG. 14 is similar to that of the first embodiment shown in FIG. 1, no detailed description will be made on the same except for differences from the first embodiment.

FIG. 14 is a flow chart showing a method for matching the focal position and photographic surface of the electronic camera of the second embodiment and primarily showing operations of the system controller 15.

When initialization and the like are carried out similarly to the first embodiment after the activation of the electronic camera, the system controller 15 determines whether the test mode has been enabled at step S300. If not, the process proceeds to step S320.

At step S320, the state of the release switch is detected. If the release switch is on, the process proceeds from step S320 to step S321. At step S321, the AF sensor module 5 performs integration similarly to that described above. The operation is controlled by the focus detection circuit 38 under the control of the system controller 15.

When the integration is completed, the data are input to the system controller 15 from the sensor at step S322. At step S323, an interval between two images of the object is calculated based on the data.

At step S323, the system controller 15 calculates an amount of defocus from the difference between the actual image interval and a design image interval. At step S325, the defocus amount is converted into an amount of lens movement (Px) which is the number of pulses from the photo-interrupter 48.

At step S326, the system controller 15 reads a deviation ΔP from the EEPROM 23. The deviation ΔP is a parameter measured in the test mode which indicates that no image of the object is formed on the image sensor 11 (image pick-up device) without a movement in the amount ΔP in a plus or minus direction in addition to Px obtained from the output of the AF sensor module 5.

At step S327, the photographic lens 1 is driven based on Px and ΔP. At step S328, image data are fetched into the system controller 15 from the image sensor 11 under predetermined conditions.

When the system controller 15 determines that the test mode has been enabled at step S300, the process proceeds to step S301. The electronic camera 100 is mounted on a bench as shown in FIG. 13 or the like in advance.

At step S301, a chart associated with the bench is set as the chart B. The purpose is to facilitate focus detection with the AF module 5. When the chart B is set, a focus detecting operation is performed at steps S302 through S306. The operation is the same as the operation at steps S321 through S325.

At step S307, the system controller 15 drives the photographic lens 1 based on the amount Px calculated above. At step S308, the chart associated with the bench is set as the chart A. The purpose is to facilitate focus detection with the image sensor 11.

At step S309, the system controller 15 performs integration on the image sensor 11. At step S310, image data are fetched from the image sensor 11. At step S311, contrast is calculated based on the image data.

At step S312, the system controller 15 determines whether the maximum contrast has been achieved or not. If not, the process proceeds to step S313 to move the photographic lens 1 by a predetermined amount. The process then proceeds to step S309 to calculate contrast again.

Thereafter, the movement of the photographic lens 1 and contrast calculation is repeated and, when a peak of contrast is detected, the process proceeds from step S312 to step S314. At step S314, the system controller 15 identifies the position of the peak contrast in terms of the number of pulses from the photo-interrupter 48 using the position of the lens set at step S307 as a reference. This provides the deviation ΔP. The number of pulses is stored in the EEPROM 23 at step S315.

Other aspects of the operation will not be described here because they are the same as those of the first embodiment.

As described above, the electronic camera of the second embodiment provides an advantage in that the focal position and the photographic surface can be matched with higher accuracy in addition to the same advantageous as in the first embodiment.

In this invention, it is apparent that working modes different in a wide range can be formed on this basis of this invention without departing from the spirit and scope of the invention. This invention is not restricted by any specific embodiment except being limited by the appended claims.

What is claimed is:

1. An electronic camera for electronic photography utilizing an image pick-up device, comprising:
   a focus detection sensor for photoelectrically converting a pair of images of an object formed by a pair of beams of light which have passed through a photographing lens respectively;
   a first focus detection circuit for measuring an interval between the images of the object based on an output of the focus detection sensor and for outputting first information on the state of focusing of the photographing lens based on the interval;
   a second focus detection circuit for measuring a peak position of contrast values of the images of the object from image data output by the image pick-up device and for outputting second information on the measured state of focusing of the photographing lens based on the peak position of the contrast values;
   an arithmetic circuit for calculating a control parameter for correcting any relative deviation of the focal position of the photographing lens based on the first and second information;
   a mode setting circuit for setting a normal mode for performing an AF operation based on a phase difference calculation and a normal electronic photographic operation using the first focus detection circuit and a test mode for adjusting the focal position of the image pick-up device using the first focus detection circuit and the second focus detection circuit; and
   a control circuit for controlling the first focus detection circuit and the second focus detection circuit when the test mode is set by the mode setting circuit and for controlling only the first focus detection circuit when the normal mode is set by the mode setting circuit.

2. An electronic camera according to claim 1, wherein the mode setting of the mode setting circuit is determined according to a communication request from an external controller provided externally to said electronic camera.

3. An electronic camera according to claim 1, wherein the control parameter is an interval between images of an object which serves as a reference for calculation of an amount of defocus.

4. An electronic camera according to claim 1, wherein the control parameter is a deviation for correcting a driving amount of the photographing lens based on a calculated amount of defocus.

5. A method for adjusting the focal position of a image pick-up device in an electronic camera for electronic photography utilizing an image pick-up device, comprising the steps of:
   a first focus detecting step including measuring an interval between images of an object formed by a pair of beams of light which have been split after passing through a photographic lens and outputting first information on the measured state of focusing of the photographic lens based on the interval;
   a second focus detecting step including measuring a peak position of contrast values of images of the object from image data output by the image pick-up device and outputting second information on the measured state of focusing of the photographic lens based on the peak position of the contrast values;

adjusting the focal position of the image pick-up device based on the first and second information;

setting a normal mode for a normal electronic photographic and a test mode; and controlling the first focus detecting step and the second focus detecting step when the test mode is set at the mode setting step and controlling only the first focus detecting step when the normal mode is set at the mode setting step.

6. A method for adjusting the focal position of an image pick-up device of an electronic camera according to claim 5, further comprising the step of:

calculating a first defocus amount based on an interval between images of an object obtained by AF based on phase difference calculation during the first focus detecting step and an interval stored in a storage circuit when the normal mode is set at the mode setting step.

7. A method for adjusting the focal position of an image pick-up device in an electronic camera for electronic photography utilizing an image pick-up device according to claim 5, further comprising the step of:

calculating a second defocus amount based on an interval between images of an object obtained by AF based on phase difference calculation during said first focus detecting step and an interval between images of an object resulting from the design when the normal mode is set at the mode setting step.

8. An electronic camera for electronic photography utilizing an image pick-up device, comprising:

a focus detection sensor for photoelectrically converting a pair of images of an object formed by a pair of beams of light which have passed through a photographing lens respectively;

a first focus detection circuit for measuring an interval between the images of the object based on an output of the focus detection sensor formed by a pair of beams of light which have been split after passing through a photographing lens and for outputting first information on the measured state of focusing of the photographing lens based on the interval;

a second focus detection circuit for measuring a peak position of contrast values of images of the object from image data output by the image pick-up device and for outputting second information on the measured state of focusing of the photographing lens based on the peak position of the contrast values;

a mode setting circuit for setting a normal mode and a test mode;

an arithmetic circuit for calculating an interval between images of an object which services as a reference for calculation of an amount of defocus or a deviation or correcting a driving amount for the photographing lens based on the calculated amount of defocus, as a control parameter for correcting any relative deviation of the focal position of the photographing lens based on the first and second information when the test mode is set by the mode setting circuit;

a storage circuit for storing the interval or the deviation;

a control circuit for driving the photographing lens to the focal position based on the control parameter calculated by the arithmetic circuit when the normal mode is set by the mode setting circuit; and a first defocus amount calculation circuit for calculating a first defocus amount based on an interval between images of an object obtained by AF based on phase difference calculation using the first focus detection circuit and the interval stored in the storage circuit when the normal mode is set by the mode setting circuit.

9. An electronic camera according to claim 8, further comprising:

a second defocus amount calculation circuit for calculating a second defocus amount based on an interval between images of an object obtained by AF based on phase difference calculation type using the first focus detection circuit and an interval between images of an object resulting from the design.

10. An electronic camera according to claim 9, further comprising:

a correction circuit for correcting a driving amount of the photographic lens based on the second defocus amount calculated by the second defocus amount calculation circuit by adding the deviation stored in said storage circuit.

11. A focal position adjusting system for adjusting the focal position of an image pick-up device, comprising:

an electronic image pick-up apparatus for electronic photography utilizing an image pick-up device including a first focus detection circuit for measuring an interval between images of an object formed by a pair of beams of light which have been split after passing through a photographic lens and for outputting first information on the state of focusing of the photographic lens based on the measured interval, a second focus detection circuit for measuring contrast values of images of the object from image data output by the image pick-up device and for outputting second information on the state of focusing of the photographic lens based on the measured contrast values, a mode setting circuit for setting a normal mode and a test mode, an arithmetic circuit for calculating a control parameter for correcting any relative deviation of the focal position of said photographic lens based on said first and second information when the test mode is set by the mode setting circuit and a control circuit for driving the photographic lens to the focal position based on the control parameter calculated by the arithmetic circuit when the normal mode is set by the mode setting circuit;

a first chart used for the measurement of the interval with said first focus detection circuit when the test mode is set by the mode setting circuit and a second chart used for the measurement of the contrast values with the second focus detection circuit; and an external controller connected to the electronic image pick-up apparatus.

12. A focal position adjusting system according to claim 11, wherein the external controller controls switching between the first chart and the second chart and makes a communication request to the electronic image pick-up apparatus to determine the mode setting with the mode setting circuit.

13. A method for adjusting the focal position of an image pick-up device of an electronic camera for electronic photography, utilizing an image pick-up device according to claim 11, further comprising the step of:

correcting a driving amount of the photographic lens based on the second defocus amount calculated during said second defocus amount calculation step by adding a deviation stored in a storage circuit.

* * * * *